United States Patent
Gotoh

(10) Patent No.: US 8,207,715 B2
(45) Date of Patent: Jun. 26, 2012

(54) SOFT-START CIRCUIT AND POWER SUPPLY CIRCUIT INCLUDING SAME

(75) Inventor: Takashi Gotoh, Itami (JP)

(73) Assignee: Ricoh Company, Ltd., Tokyo (JP)

( * ) Notice: Subject to any disclaimer, the term of this patent is extended or adjusted under 35 U.S.C. 154(b) by 370 days.

(21) Appl. No.: 12/640,110

(22) Filed: Dec. 17, 2009

(65) Prior Publication Data

US 2010/0156382 A1 Jun. 24, 2010

(30) Foreign Application Priority Data

Dec. 19, 2008 (JP) ................................ 2008-324179

(51) Int. Cl.
G05F 1/10 (2006.01)
H02M 7/10 (2006.01)
(52) U.S. Cl. ........................... 323/238; 323/901; 363/49
(58) Field of Classification Search .................. 323/238, 323/280, 282, 284, 312, 901, 908; 363/49
See application file for complete search history.

(56) References Cited

U.S. PATENT DOCUMENTS

| | | | | |
|---|---|---|---|---|
| 4,625,271 A * | 11/1986 | Chetty et al. | ..................... | 363/49 |
| 7,088,078 B2 * | 8/2006 | Liu | ................ | 323/207 |
| 7,514,910 B2 * | 4/2009 | Nishida | ......................... | 323/282 |
| 7,573,252 B1 * | 8/2009 | Griesert | ........................ | 323/315 |
| 7,586,297 B2 * | 9/2009 | Kitagawa | ..................... | 323/282 |
| 7,605,573 B2 * | 10/2009 | Nishida | ........................ | 323/282 |
| 7,619,397 B2 * | 11/2009 | Al-Shyoukh | ................. | 323/281 |
| 7,719,249 B2 * | 5/2010 | Matyas et al. | ................ | 323/285 |
| 7,876,073 B2 * | 1/2011 | Sohma | ........................ | 323/222 |
| 7,906,945 B2 * | 3/2011 | Kao et al. | ...................... | 323/238 |
| 7,957,165 B2 * | 6/2011 | Hasegawa et al. | .............. | 363/49 |
| 2006/0023476 A1 * | 2/2006 | Fosler | ............................ | 363/49 |

FOREIGN PATENT DOCUMENTS

| JP | 3396122 | 2/2003 |
|---|---|---|
| JP | 2007-043862 | 2/2007 |
| JP | 2007-159288 | 6/2007 |
| JP | 2007-244086 | 9/2007 |
| JP | 2008-141833 | 6/2008 |

* cited by examiner

*Primary Examiner* — Adolf Berhane
(74) *Attorney, Agent, or Firm* — Cooper & Dunham LLP

(57) ABSTRACT

A soft-start circuit to generate and output a soft-start voltage having a specified gradient. The soft-start circuit includes a slope voltage generator circuit to generate and output multiple slope voltages having different specified gradients, including a steepest slope voltage whose gradient is steepest among the gradients of the multiple slope voltages and a mildest slope voltage whose gradient is mildest thereamong, at least one voltage conversion circuit to receive the slope voltages and output a voltage whose gradient is milder than the gradient of the steepest slope voltage, and a selection circuit to receive at least one specified reference voltage and the voltage generated by the voltage conversion circuit, compare the voltage by the voltage conversion circuit with the specified reference voltage, and output either the voltage or the specified reference voltage as the soft-start voltage in accordance with a comparison result generated by the selection circuit.

20 Claims, 9 Drawing Sheets

SOFT-START CIRCUIT AND POWER SUPPLY CIRCUIT INCLUDING SAME

CROSS-REFERENCE TO RELATED APPLICATIONS

This patent specification claims priority from Japanese Patent Application No. 2008-324179, filed on Dec. 19, 2008 in the Japan Patent Office, which is hereby incorporated by reference herein in its entirety.

BACKGROUND OF THE INVENTION

1. Field of the Invention

The present invention relates to a soft-start circuit used in a power supply circuit to prevent an excessive increase in output current to a load during start-up, and a power supply circuit including the soft-start circuit.

2. Discussion of the Background

Generally, power supply circuits configured as integrated circuits (IC) that adjust the gradient of a soft-start voltage by changing the capacity of a capacitor provided outside the integrated circuits are widely used. Because a capacitor provided inside the integrated circuit requires a large area, it is unrealistic to increase the capacity of the capacitor so as to reduce the gradient of the soft-start voltage. Consequently, the capacitors have to be positioned outside the integrated circuit.

For example, one related-art power supply circuit includes a soft-start circuit that generates a single slope voltage and outputs a voltage that follows the slope voltage as a soft-start voltage.

In this circuit, when the soft-start circuit generates the slope voltage by charging the capacitor (external capacitor) positioned outside the integrated circuit from a power source and outputs the soft-start voltage that follows the slope voltage, the gradient of the soft-start voltage can be adjusted by changing the capacity of the external capacitor.

However, this configuration always requires the external capacitor when the gradient of the soft-start voltage is adjusted to any given gradient. Therefore, it can happen that, when the capacitor is insulated due to a defect in manufacture of the circuit or the like, the gradient of the soft-start voltage becomes steeper, and a large current flows to the load connected to a power supply circuit configured as an IC, thus causing failure of the load.

In another related-art power supply circuit including a soft-start circuit, when the soft-start circuit generates the slope voltage by charging a capacitor provided inside the integrated circuit (hereinafter "internal capacitor") from a power source and outputs the soft-start voltage that follows the slope voltage, the gradient of the soft-start voltage is reduced by decreasing the current from the current source that charges the capacitor without increasing the capacity of the internal capacitor.

In this configuration, the external capacitor is not required, and thus the number of external components can be reduced. However, because no capacitor is provided outside the integrated circuit, the gradient of the slope voltage cannot be adjusted.

In view of the foregoing, there is market demand for power supplies including a soft-start circuit that outputs a soft-start voltage with a milder gradient.

SUMMARY OF THE INVENTION

In view of the foregoing, one illustrative embodiment of the present invention provides a soft-start circuit to generate and output a soft-start voltage having a specified gradient. The soft-start circuit includes a slope voltage generator circuit that generates and outputs multiple slope voltages having different specified gradients, including a steepest slope voltage whose gradient is the steepest of the gradients of the multiple slope voltages; a first voltage conversion circuit receives the multiple slope voltages and outputs a first voltage whose gradient is milder than the gradient of the steepest slope voltage; a second voltage conversion circuit receives the multiple slope voltages and outputs a second voltage whose gradient is milder than the gradient of the steepest slope voltage; and a selection circuit receives a specified first reference voltage, a specified second voltage, the first voltage, and the second voltage, compares the second voltage with a specified second reference voltage, and outputs either the first voltage or the specified first reference voltage as the soft-start voltage in accordance with a comparison result generated by the selection circuit.

Another illustrative embodiment of the present invention provides a soft-start circuit to generate and output a soft-start voltage having a specified gradient. The soft-start circuit that includes a slope voltage generator circuit generates and outputs multiple slope voltages having different specified gradients, including a steepest slope voltage whose gradient is steepest among the gradients of the slope voltages; a single voltage conversion circuit receives the slope voltages and outputs a first voltage whose gradient is milder than the gradient of the steepest slope voltage; and a selection circuit receives a specified first reference voltage and the first voltage, compares the first voltage with a specified first reference voltage, and outputs either the first voltage or the specified first reference voltage as the soft-start voltage in accordance with a comparison result generated by the selection circuit.

Yet another illustrative embodiment of the present invention provides a power supply circuit to change an input voltage applied to an input terminal and output a specified voltage from an output terminal. The power supply circuit includes an output transistor to control the output voltage by operating in accordance with a control signal from a control terminal, and one of the soft-start circuits described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
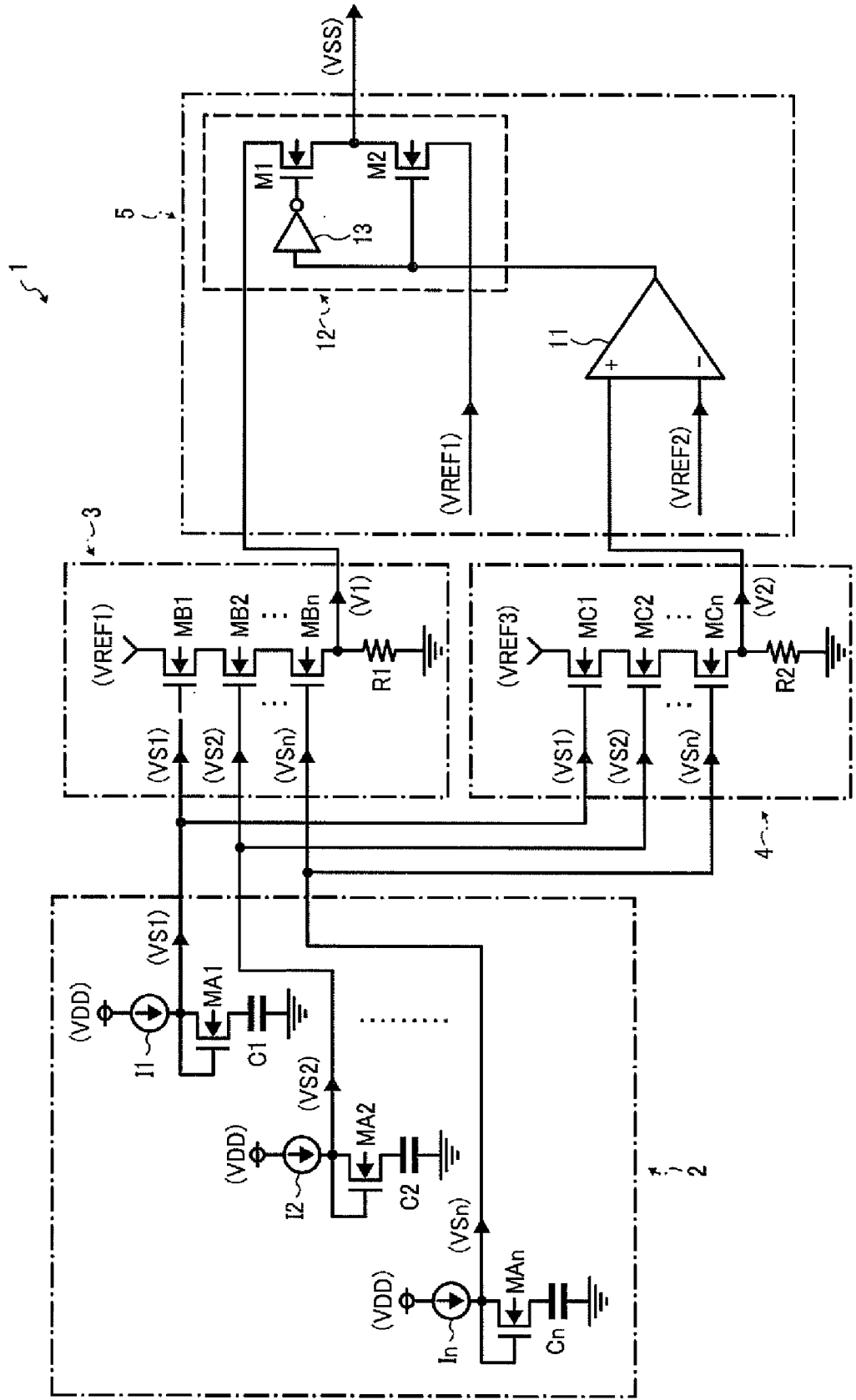
FIG. 1 illustrates circuitry of a soft-start circuit according to a first illustrative embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, particularly to FIGS. 1 and 2, a DC-DC converter according to an example embodiment of the present invention is described below.

First Embodiment

FIG. 1 illustrates circuitry of a soft-start circuit 1 according to the present embodiment.

The soft-start circuit 1 includes a slope voltage generator circuit 2, a first voltage conversion circuit 3, a second voltage conversion circuit 4, and a selection circuit 5. The slope voltage generator circuit 2 generates and outputs multiple slope voltages VS1 through VSn (where n (integer)>1). The first voltage conversion circuit 3 and the second voltage conversion circuit 4 change the voltage of slope voltages VS1 through VSn. The slope voltage generator circuit 2 includes negative-channel metal oxide semiconductor (NMOS) transistors MA1 through MAn, current sources I1 through In, and capacitors C1 through Cn. The first voltage conversion circuit 3 includes NMOS transistors MB1 through MBn and a resistor R1. The second voltage conversion circuit 4 includes NMOS transistors MC1 through MCn and a resistor R2. The selection circuit 5 includes a voltage comparison circuit 11 and a switch circuit 12 including an inverter 13 and NMOS transistors M1 and M2.

In the slope voltage generator circuit 2, the current source Ik (1<k<n) is connected between a power source voltage VDD and the drain of NMOS transistor MAk, and the capacitor Ck is connected between the source of the NMOS transistor MAk and a ground terminal GND. The gate of the NMOS transistor MAk is connected to the drain thereof, and the slope voltages VSk are outputted from respective junction nodes between the gates and the drains of the NMOS transistors MA1 through MAn.

Further, in the first voltage generator circuit 3, the NMOS transistors MB1 through MBn are connected in series between a first reference voltage VREF1 and one end of the resistor R1, and the other end of the resistor R1 is connected to the ground terminal GND. The slope voltages VSk are applied to the respective gates of the NMOS transistors MBk, and a first voltage V1 is outputted from a junction node between the NMOS transistor MBn and the resistor R1. Similarly, in the second voltage generator circuit 4, the NMOS transistors MC1 through MCn are connected in series between a third reference voltage VREF3 and one end of the resistor R2. The other end of the resistor R2 is connected to the ground terminal GND. The slope voltages VSk are applied to the respective NMOS transistors MCk, and a second voltage V2 is outputted from a junction node between the NMOS transistor MCn and the resistor R2.

In the selection circuit 5, the second voltage V2 is applied to a non-inverting input terminal of the voltage comparison circuit 11, and a second reference voltage VREF2 is applied to an inverting input terminal of the voltage comparison circuit 11. An output terminal of the voltage comparison circuit 11 is connected to the gate of the NMOS transistor M2 and (via the inverter 13) to the gate of the NMOS transistor M1 as well. The NMOS transistors M1 and M2 are connected in series between the first voltage V1 and the first reference voltage VREF1, and a soft-start voltage VSS is outputted from a junction node between the NMOS transistors M1 and M2.

In this configuration, the slope voltages VS1 through VSn are set to a sum of the charging voltage of the corresponding one of the capacitor C1 through Cn from the respective current sources I1 through In and the threshold voltage Vth of the NMOS transistor. The gradient of the slope voltages VS2 through VSn are designed to be steeper than the gradient of the charging voltage (slope voltage VS1) generated by charging the capacitor C1 from the current source I1. The capacitor C1 serves as an external capacitor that is connected to the soft-start circuit 1. When the capacitor C1 is disconnected from the soft-start circuit 1, the gradient of the slope voltage VS1 is upright or exceedingly steep.

The first voltage conversion circuit 3 generates and outputs the first voltage V1 that follows the lowest voltage (mildest voltage) among the slope voltages VS1 through VSn applied thereto. The upper limit of the first voltage V1 is the first reference voltage VREF1.

The second voltage conversion circuit 4 generates and outputs the second voltage V2 that follows the lowest voltage (mildest voltage) among the slope voltages VS1 through VSn applied thereto. The upper limit of the second voltage V2 is the third reference voltage VREF3. That is, the first voltage conversion circuit 3 generates and outputs the first voltage V1 whose gradient is milder than the gradient (steepest gradient) of the steepest slope voltage among the multiple slope voltage VS1 through VSn, and similarly, the second voltage conversion circuit 4 generates and outputs the second voltage V2 whose gradient is milder than the steepest gradient.

In this circuit, the third reference voltage VREF3 is higher than the second reference voltage VREF2, and the second reference voltage VREF2 is higher than the first reference voltage VREF1.

The first voltage conversion circuit 3 and the second voltage conversion circuit 4 are wired as "multistage source follower" so as to obtain the circuit whose voltage is lowest.

The first voltage conversion circuit 3 generates and outputs the first voltage V1 by subtracting a threshold voltage Vth of the NMOS transistors from the lowest voltage among the applied slope voltages VS1 through VSn.

Similarly, the second voltage conversion circuit 4 generates and outputs the second voltage V2 by subtracting the threshold voltage Vth of the NMOS transistors from the lowest voltage among the applied slope voltages VS1 through VSn. More specifically, until the second voltage V2 reaches the third reference voltage VREF3 as the upper limit, the second voltage V2 has a gradient that is identical to the gradient of the mildest voltage of the slope voltages VS1 through VSn and a voltage value that is constant by subtracting the threshold voltage Vth of the NMOS transistors from the lowest voltage among the applied slope voltages VS1 through VSn. Additionally, the second voltage V2 is equal to the first voltage until the first voltage V1 reaches the first reference VREF1, after which the second voltage is greater than the first voltage V1.

In the selection circuit 5, the voltage comparison circuit 11 compares the second voltage V2 with the second reference voltage VREF2. When the second voltage V2 is lower than the second reference voltage VREF2, the voltage comparison circuit 11 outputs a low level signal. Then, the NMOS transistor M1 is turned on and rendered conductive, and the NMOS transistor M2 is turned off and insulated. Thus, the switch circuit 12 outputs the first voltage V1 as the soft-start voltage VSS. At this time, until the first voltage V1 reaches the first reference voltage VREF1 as the upper limit, the first voltage V1 (the output voltage VSS) has a gradient that is identical to the gradient of the mildest voltage of the slope voltages VS1 through VSn, and a voltage value that remains lower than the lowest voltage of the slope voltages VS1 through VSn by an amount equal to the threshold voltage Vth of the NMOS transistor MA1 through MAn.

By contrast, when the second voltage V2 is equal to or higher than the second reference voltage VREF2, the voltage comparison circuit 11 outputs a high level signal. Then, the NMOS transistor M1 is turned off and insulated, and the NMOS transistor M2 is turned on and conductive. Thus, the switch circuit 12 outputs the first reference voltage VREF1 as the soft-start voltage VSS.

More specifically, when the second voltage V2 is lower than the second reference voltage VREF 2 and the capacitor C1 is connected normally, the first voltage V1 that follows the lowest voltage among the applied slope voltages VS1 through VSn is outputted from the circuit 1 as the soft-start voltage VSS.

However, even when the second voltage V2 is lower than the second reference voltage VREF 2, when the capacitor C1 is disconnected from the soft-start circuit 1, the first voltage V1 that follows the lowest voltage among the applied slope voltages VS2 through VSn is outputted from the circuit 1 as the soft-start voltage VSS.

By contrast, when the second voltage V2 is equal to or higher than the second reference voltage VREF2, regardless of whether the capacitor C1 is connected to the soft-start circuit 1, the first reference voltage VREF is outputted from the soft-start circuit 1 as the soft-start voltage VSS.

The upper limit of the second voltage V2 applied to the voltage comparison circuit 11 is higher than the upper limit of the first voltage V1 applied to the switch circuit 12, and the second reference voltage VREF2 is higher than the first reference voltage VREF1. Therefore, by the time the second voltage V2 is equal to the reference voltage VREF2, the first voltage V1 has already reached the first reference voltage VREF1 as the upper limit voltage. Consequently, while the soft-start voltage VSS outputted from the switch circuit 12 is switched from the first voltage V1 to the first reference voltage VREF1, switching distortion of the soft-start voltage VSS can be prevented.

The first voltage V1 or the second voltage V2 when the soft-start circuit 1 is activated is lower than the voltage of the slope voltage VS1 through VSn by the threshold voltage Vth of the NMOS transistor. Therefore, unless the start voltage of the slope voltage VS1 through VSn is set to a sum of the charging voltage of the corresponding one of the capacitor C1 through Cn and the threshold voltage Vth of the NMOS transistor, the start voltage of the slope voltage VS1 through VSn might not set to the threshold voltage Vth. Consequently, the start voltage of the first voltage V1 or the second voltage V2 might not be 0 volt.

Figure 2:
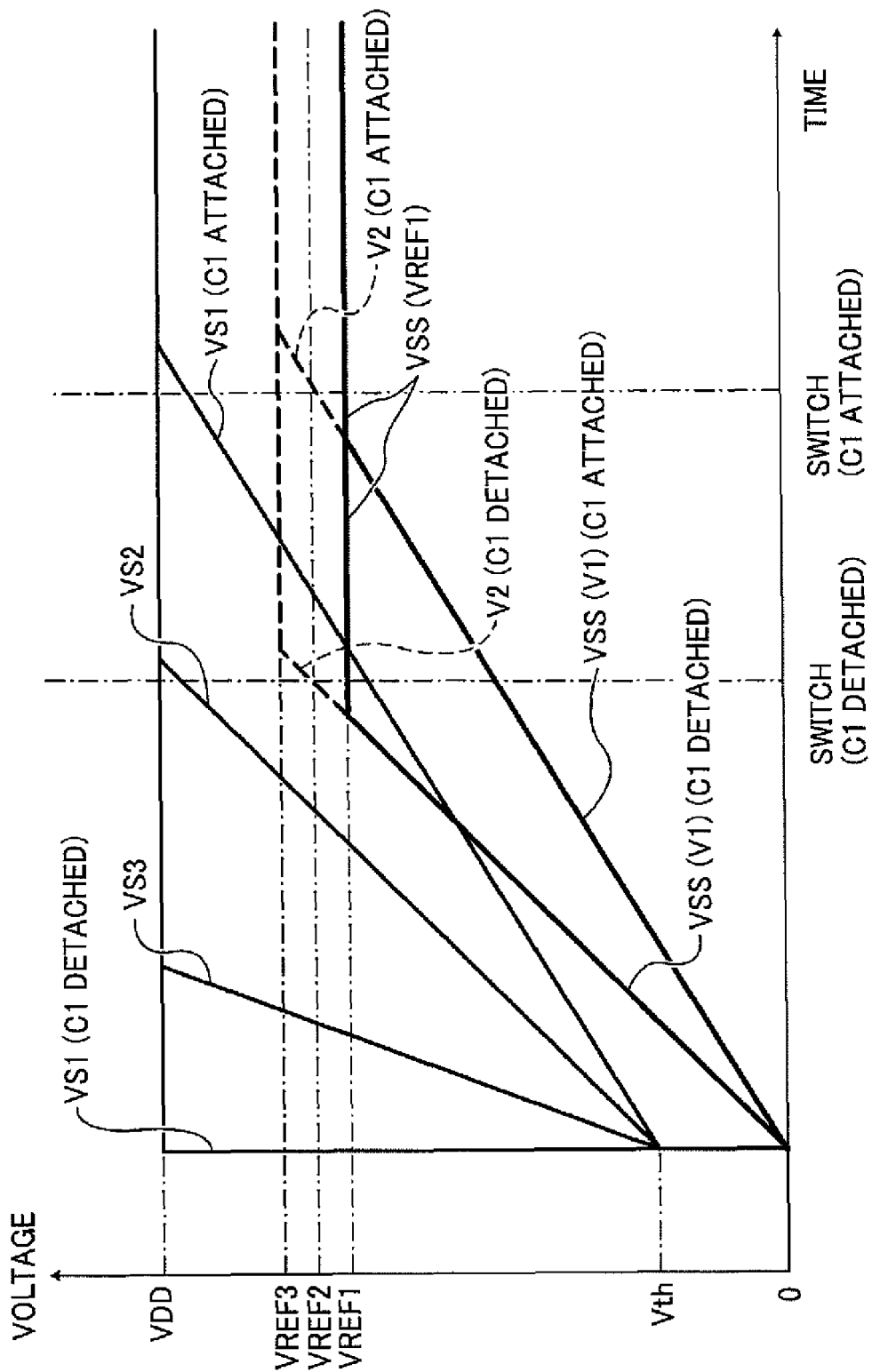
FIG. 2 shows respective voltages in the soft-start circuit shown in FIG. 1.

FIG. 2 shows respective voltages in the soft-start circuit 1 shown in FIG. 1.

In the present embodiment, because the start voltages of the first voltage V1 and the second voltage V2 are lower than the voltage of the slope voltages VS1 through VSn by the threshold voltage Vth of the NMOS transistor, the start voltage of first voltage V1 and the second voltage V2 can be 0 volts.

Variation

Figure 3:
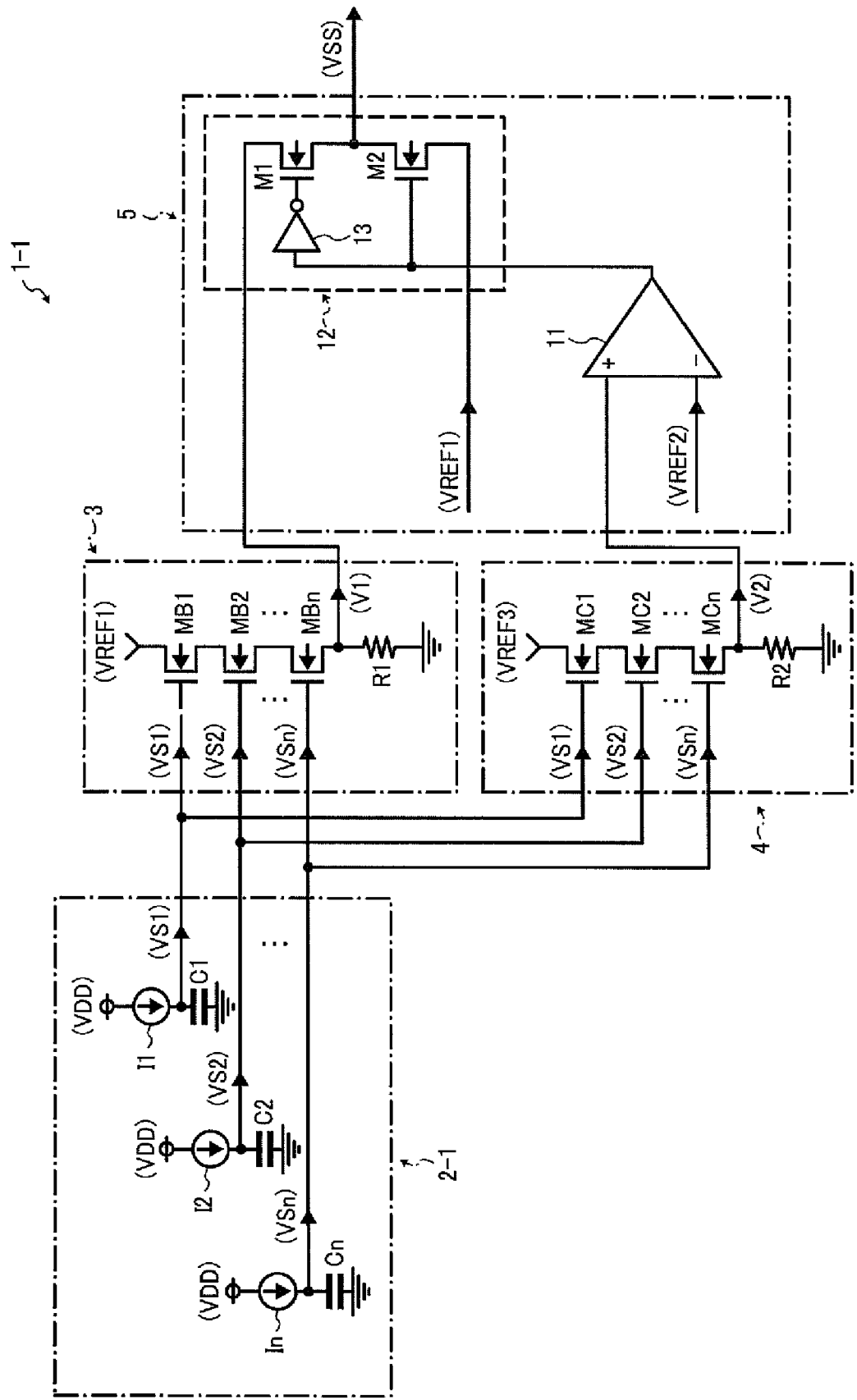
FIG. 3 illustrates a variation of the soft-start circuit shown in FIG. 1.

In order to adjust the start voltage of the first voltage V1 and the second voltage V2 to 0 volt, a soft-start circuit 1-1 shown in FIG. 3 can be adopted instead of the soft-start circuit 1 shown in FIG. 1. It is to be noted that, in FIG. 3, the components of the first voltage conversion circuit 3, the second voltage conversion circuit 4, and the selection circuit 5 that are identical or similar to the above-described components included in the soft-start circuit 1 shown in FIG. 1 are given identical reference characters and descriptions thereof are omitted below for simplicity.

The difference between the soft-start circuit 1-1 shown in FIG. 3 and the soft-start circuit 1 shown in FIG. 1 is that a slope voltage generator circuit 2-1 does not include the NMOS transistors MA1 through MAn and the current sources I1 through In are directly connected to the respective capacitor C1 through Cn.

In this configuration, the start voltage of the slope voltages VS1 through VSn is set to 0 volt, and therefore, the start voltage of the first voltage V1 and the second voltage V2 can be set to 0 volt. Therefore, until the first voltage V1 reaches the first reference voltage VREF1 as the upper limit, the output voltage VSS has a gradient that is identical to the gradient of the slope voltage VS2 and a voltage value that is identical to voltage value of the slope voltage VS2.

Power Supply Circuit

Next, circuitry of a power supply circuit 20 using the soft-start circuit 1 shown in FIG. 1 is described below with reference to FIG. 4.

Figure 4:
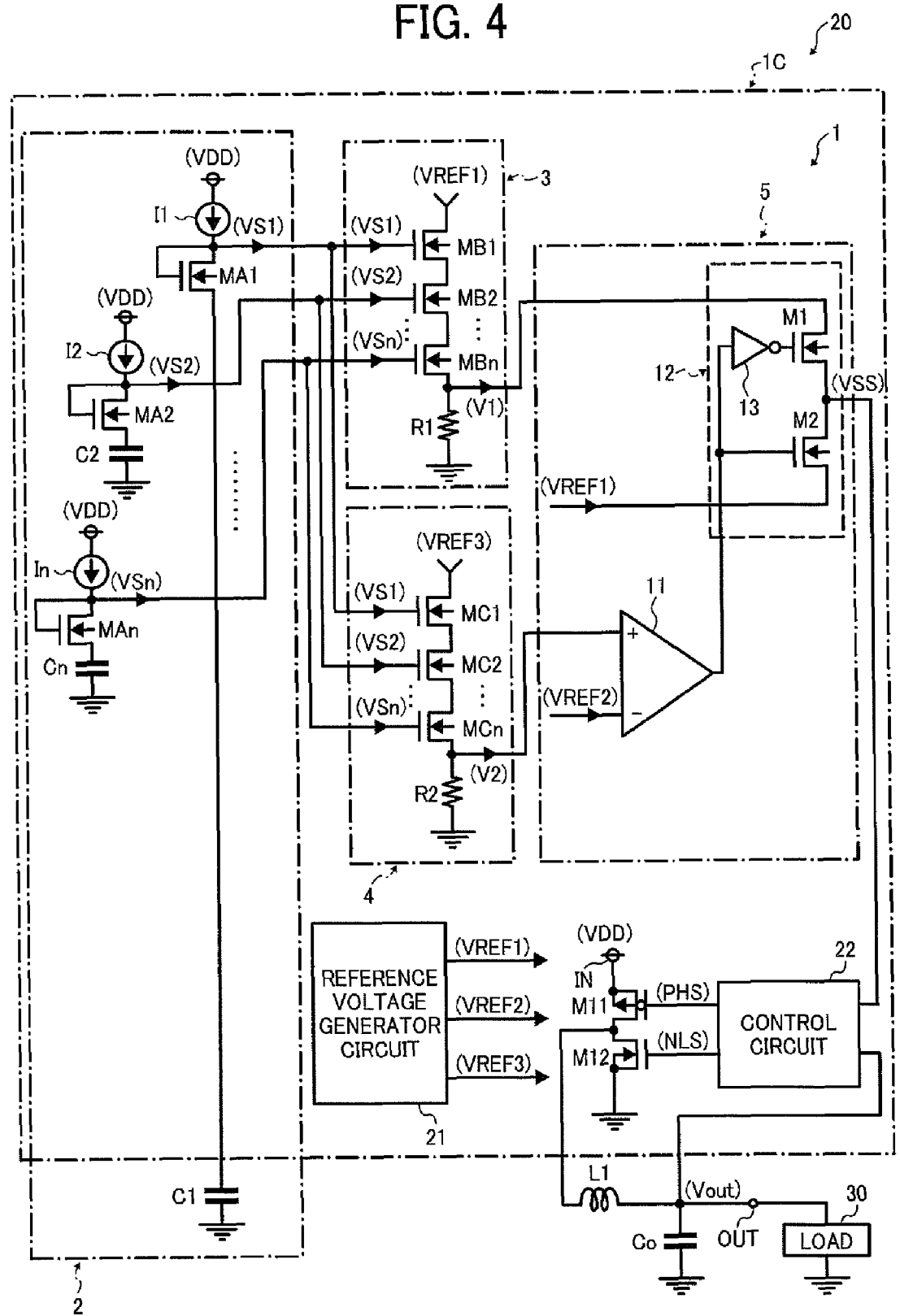
FIG. 4 illustrates circuitry of a power supply circuit using the soft-start circuit shown in FIG. 1.

In FIG. 4, the power supply circuit 20 functions as a synchronous step-down switching regulator that steps down an input voltage VDD inputted to an input terminal IN to a specified voltage and outputs it as an output voltage Vout from an output terminal OUT to a load 30. The power supply circuit 20 includes a synchronous rectification transistor M12 constituted by a NMOS transistor and an output transistor M11 constituted by an NMOS transistor that operates switching in order to control output of the input voltage VDD.

Further, the power supplying 20 includes a reference voltage generator circuit 21 that generates and outputs the first reference voltage VREF1, the second reference voltage VREF2, and the third reference voltage VREF3 to the slope voltage generator circuit 2; the soft-start circuit 1; a control circuit 22 that controls switching of the output transistor M11 and the synchronous rectification transistor M12; an inductor L1; and an output capacitor Co.

It is to be noted that, in the power supply circuit 20, the respective circuits except the inductor L1, the capacitor C1, and the output capacitor Co can be integrated on a single integrated circuit (IC). Alternatively, the respective circuits except the output transistor M11, the synchronous rectification transistor M12, the inductor 11, the capacitor C1, and the output capacitor Co can be integrated on a single IC.

In this circuit, at least one of the capacitors (C1) related to generation of at least one slope voltage (VS1) can be positioned outside of the integrated circuit, and the other capacitor related to generation of the other slope voltages (VS2 through VSn) can be positioned inside of the integrated circuit. Therefore, the soft voltage VDD can be either the slope voltage decided by the external component or the slope voltage decided by the internal component (whose gradient is milder), and a large current flow to the load when the power supply circuit is started up can be prevented.

When pulse width modulation (PWM) is performed, the control circuit 22 generates a feedback voltage Vfb by dividing the output voltage Vout and generates an error voltage Verr by amplifying the voltage difference between the feedback voltage Vfb and the output voltage VSS from the soft-start circuit 1. In this circuit, the first voltage conversion circuit serves as a first voltage conversion part, the second voltage conversion circuit serves as a second voltage conversion circuit. Then, the control circuit 22 modulates the pulse width of the error voltage Verr using a triangular wave signal, etc., to produce pulse signals. The control circuit 22 generates control signals PHS and NLS in accordance with the pulse signals and outputs the control signals PHS and NLS to the respective gates of the output transistor M11 and synchronous rectification transistor M12, so that the output transistor M11 and the synchronous rectification transistor M12 perform complementary switching operations, that is, operate in opposite ways.

More specifically, the output transistor M11 and the synchronous rectification transistor M12 are connected in series between the input voltage VDD and the ground terminal GND, and the inductor L1 is connected between the output voltage Vout and a junction node between the output transistor M11 and the synchronous rectification transistor M12. The output capacitor Co is connected between the output voltage Vout and the ground terminal GND, and the output voltage Vout and the output voltage VSS from the soft-start circuit 1 are applied to the control circuit 22. The control circuit 22 generates the control signals PHS and NLS in accordance with the applied output voltages Vout and VSS and then outputs the control signals PHS and NLS to the respective gates of the output transistor M11 and the synchronous rectification transistor M12.

In the above-described configuration, as the output voltage Vout of the power supply circuit 20 is increased, the error voltage Verr decreases, and accordingly a duty cycle of the pulse signals becomes shorter. Consequently, a time period during which the output transistor M11 is ON is shortened, and accordingly a time period during which the synchronous rectification transistor M12 is ON is lengthened. Thus, the power supply circuit 22 is controlled such that the output voltage Vout is decreased.

Additionally, as the output voltage Vout is decreased, the error voltage Verr increases, and accordingly the duty cycle of the pulsed signal becomes longer. Consequently, as a time period during which the output transistor M11 is ON becomes longer, a time period during which the synchronous rectification transistor M12 is ON is shortened. Again, the power supply circuit 20 is controlled such that the output voltage Vout is increased.

Repeating the above-described operation, the power supply circuit 20 is controlled such that the output voltage Vout is constantly kept at a specified voltage.

Variation

Figure 5:
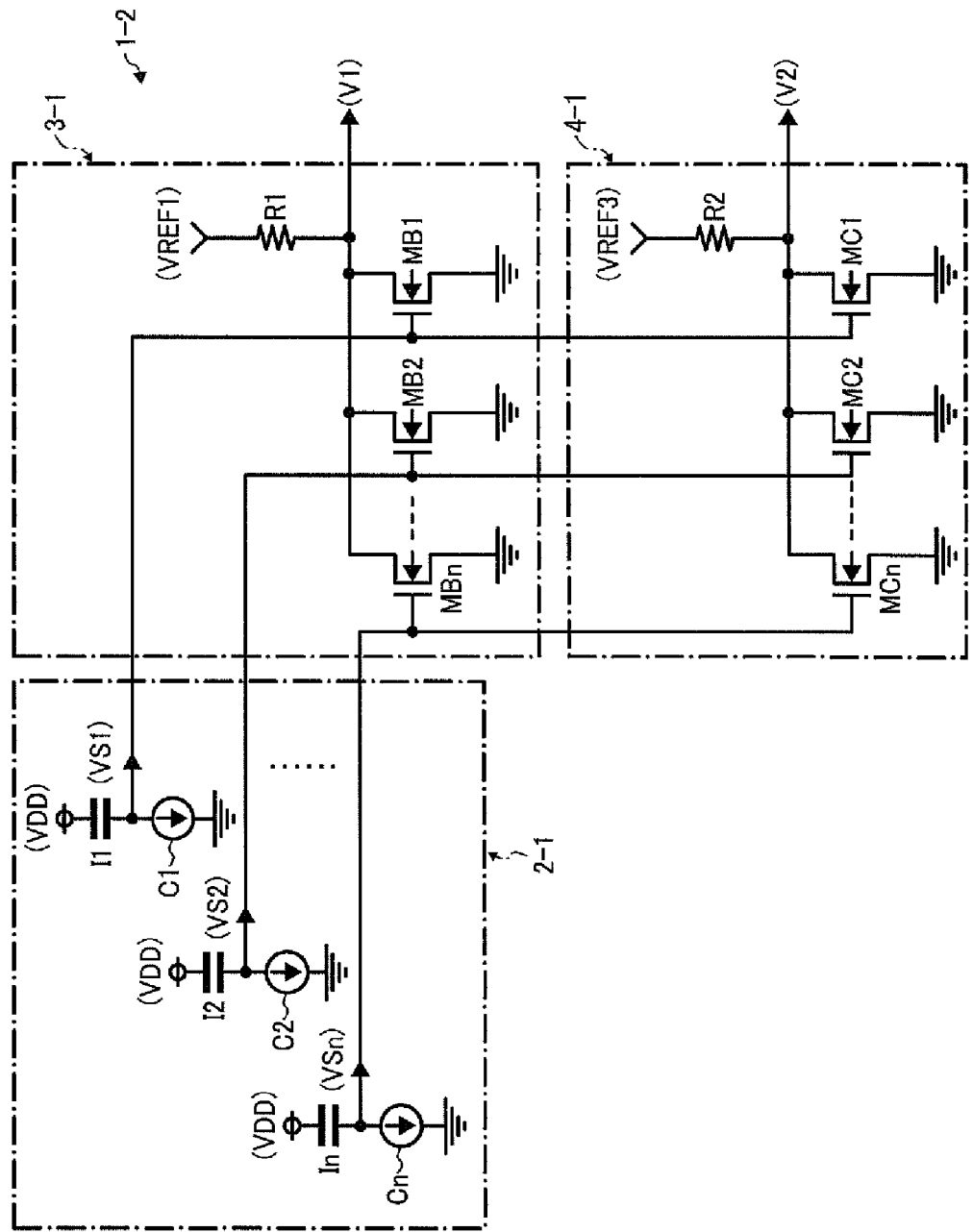
FIG. 5 illustrates another variation of the soft-start circuit shown in FIG. 1.

A variation of the soft-start circuits described above is described below with reference to FIG. 5. FIG. 5 illustrates a variation of the configuration shown in FIG. 3. A variation of the configuration shown in FIG. 1 is similar to that shown in FIG. 5. It is to be noted that, in FIG. 5, descriptions of components identical or similar to those shown in FIGS. 1 and 3 are omitted below for simplicity.

In the circuits shown in FIGS. 1 and 3, in each of the first voltage conversion circuit 3 and the second voltage conversion circuit 4, the serially-connected NMOS transistors (MB1 through MBn or MC1 through MCn) and one resistor are connected in series. Alternatively, however, in each of a first voltage conversion circuit 3-1 and a second voltage conversion circuit 4-1, one resistor can be serially connected with a parallel circuit in which the NMOS transistors are connected in parallel as in a soft-start circuit 1-2 shown in FIG. 5.

In this case, the first voltage conversion circuit and the second voltage conversion circuit are respectively configured as a first voltage conversion circuit 3-1 and a second voltage conversion circuit 4-1 shown in FIG. 5.

In the first voltage conversion circuit 3-1 shown in FIG. 5, the first reference voltage VREF1 is applied to one end of the resistor R1, and the NMOS transistors MB1 through MBn are connected in parallel between the other end of the resistor R1 and the ground terminal GND. The slope voltages VS1 through VSn are applied to the respective gates of the NMOS transistors MB1 through MBn, and the first voltage V1 is outputted from the junction node between the resistor R1 and the NMOS transistors MB1 through MBn.

Similarly, in the second conversion circuit 4-1, the second reference voltage VREF2 is applied to one end of the resistor R2, and the NMOS transistors MC1 through MCn are connected in parallel between the other end of the resistor R2 and the ground terminal GND. The slope voltages VS1 through VSn are applied to the respective gates of the NMOS transistors MC1 through MCn, and the second voltage V2 is outputted from the junction node between the resistor R2 and the NMOS transistors MC1 through MCn.

As the first voltage V1 and second voltage V2, the first voltage conversion circuit 3-1 and the second voltage conversion circuit 4-1 shown in FIG. 5 output the voltages respectively generated by dividing the first reference voltage VREF and the second reference voltage VREF2 by the fixed resistor (R1 or R2) and the on-resistance of the NMOS transistors (MBk or MCk), connected in parallel, to whose gates the slope voltage VSk is supplied. Because the gradient of the soft-start voltage VSS is decided by the on-resistance of the NMOS transistors connected in parallel, even when the capacitor C1 is disconnected from the soft-start circuit 1 and accordingly the gradient of the slope voltage VS1 is steeper, the first voltage V1 and the second voltage V2 whose gradients are less steep can be generated.

It is to be noted that the direction of the gradient of the applied slope voltage VS1 through VSn can also be inverted against the direction of the gradient of the first voltage V1 or the second voltage V2.

Herein, as a comparative example, when an external capacitor positioned outside the integrated circuit is connected in parallel to an internal capacitor without using slope voltage generation circuit, the gradient of the soft-start voltage can be reduced by increasing the capacity of the external capacitor, and the soft-start voltage can be prevented from becoming steeper when the external capacitor is disconnected from the circuit. However, in this example, because the current flowing to the internal capacitor is decreased without increasing the capacity of the internal capacitor, output impedance in the soft-start circuit increases, thus making the soft-start circuit susceptible to external noise when the wiring is extended to connect the soft-start circuit to the external capacitor, which is a problem.

By contrast, in the soft-start circuit according to the above-described the present embodiment and its variations, when the second voltage V2 is lower than the second reference voltage VREF2 and the capacitor C1 is connected normally, the first voltage V1 that follows the lowest slope voltage among the slope voltages VS1 through VSn is outputted as the soft-start voltage VSS.

When the second voltage V2 is lower than the second reference voltage VREF2 and the capacitor C1 is disconnected, the first voltage V1 that follows the lowest slope voltage among the slope voltages VS2 through VSn is outputted as the soft-start voltage VSS.

When the second voltage V2 is equal to or higher than the reference voltage VREF, regardless of whether the capacitor C1 in connected to the soft-start circuit 1, the reference voltage VREF1 is outputted as the soft-start voltage VSS.

Therefore, in the configuration described above, two slope voltages can be generated independently from each other, and even when one of the two slope voltages becomes steeper, a soft-start voltage whose gradient is relatively small can be obtained. Additionally, when a gradient of one of the slope voltage is steeper, the output impedance in the soft-start circuit does not increases (the high impedance wire is not extended), and thus the soft-start circuit is not susceptible to external noise even when the wiring is extended to connect the soft-start circuit to the external capacitor.

Second Embodiment

Figure 6:
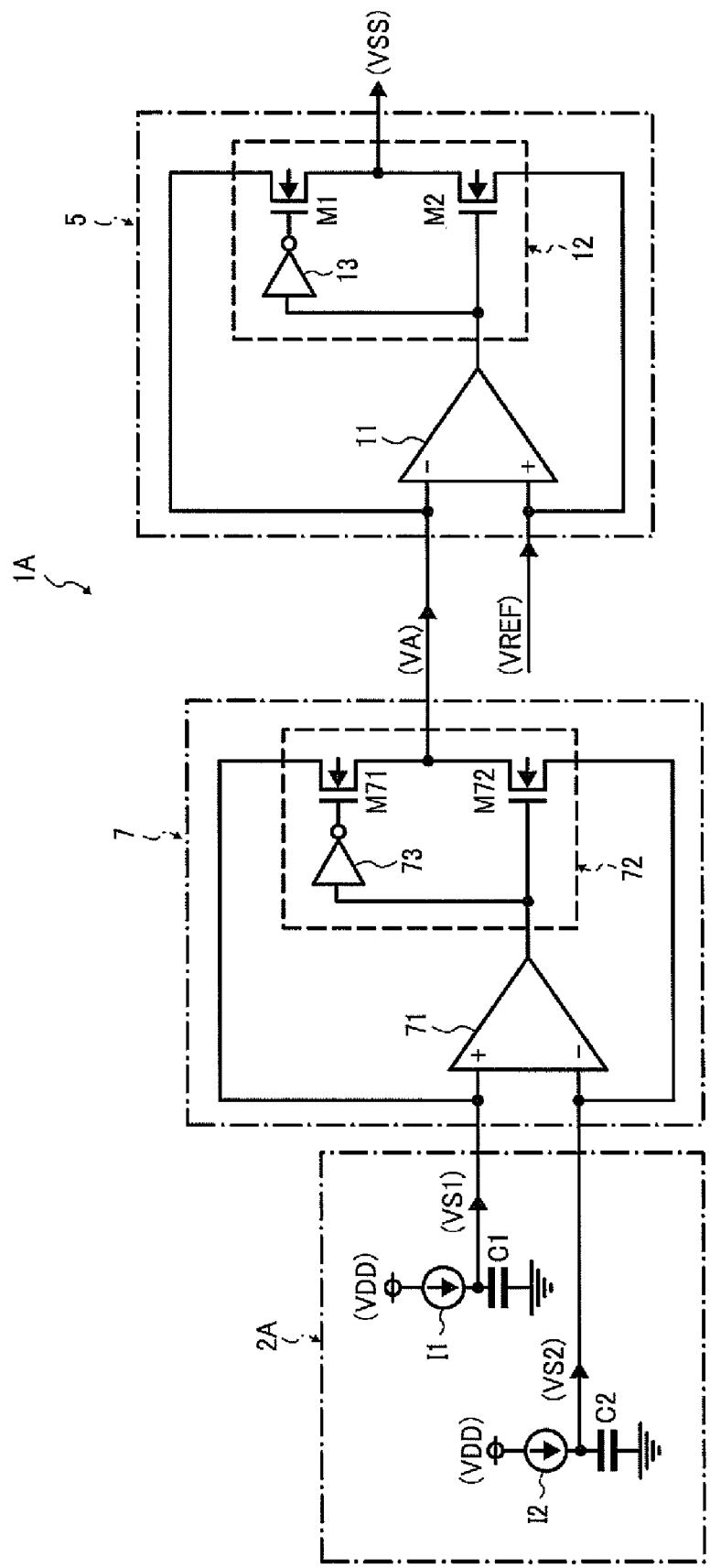
FIG. 6 illustrates circuitry of a soft-start circuit according to a second illustrative embodiment.

FIG. 6 illustrates circuitry of a soft-start circuit 1A according to a second embodiment. It is to be noted that, in FIG. 6, descriptions of components identical or similar to those shown in FIG. 3 are omitted below for simplicity.

The difference between the soft-start circuit 1A and the soft-start circuit 1-1 shown in FIG. 3 is that the soft-start circuit 1A includes a slope voltage generator circuit 2A that generates and outputs the slope voltages VS1 and VS2 instead of the slope voltage generator circuit 2, and a single voltage conversion circuit 7 that converts the voltage of the slope voltage VS1 and VS2 instead of both the first voltage conversion circuit 3 and the second voltage conversion circuit 4. The soft-start circuit 1A does include the selection circuit 5 similarly to the soft-start circuit 1-1 shown in FIG. 3.

In FIG. 6, the slope voltage generator circuit 2A includes current sources I1 and I2, and capacitors C1 and C2. The voltage conversion circuit 7 includes a voltage comparison circuit 71 and a switching circuit 72. The switching circuit 72 includes an inverter 73 and NMOS transistors M71 and M72.

In the slope voltage generator circuit 2A, the current source I1 and the capacitor C1 are connected in series between the power voltage VDD and the ground terminal GND, and the current source I1 and the capacitor C1 are also connected in series between the power voltage VDD and the ground terminal GND. The difference between the slope voltage generator circuit 2A and the slope generator circuit 2-1 shown in FIG. 3 is that the slope voltage generator circuit 2A generates and outputs two slope voltages VS1 and VS2 instead of generating the multiple slope voltages VS1 through VSn.

The slope voltage VS1 is outputted from a junction node between the current source I1 and the capacitor C1, and the slope voltage VS2 is outputted from a junction node between the current source I2 and the capacitor C2. The slope voltage VS1 is applied to a non-inverting input terminal of the voltage comparison circuit 71, and the slope voltage VS2 is applied to an inverting input terminal of the voltage comparison circuit 71.

An output terminal of the voltage comparison circuit 71 is connected to the gate of the NMOS transistor M72 as well as the NMOS transistor M71 via the inverter 73. NMOS transistors M71 and M72 are connected in series between the slope voltages VS1 and VS2. A voltage VA is outputted from a junction node between the NMOS transistors M71 and M72. Further, in the selection circuit 5, a reference voltage VREF is applied to the non-inverting input terminal of the voltage comparison circuit 11, and the voltage VA is applied to the inverting input terminal thereof.

In this embodiment, the slope voltage VS1 serves as a charging voltage generated by charging the capacitor C1 from the current source I1, and the slope voltage VS2 is a charging voltage generated by charging the capacitor C2 from the current source I2. The gradient of the slope voltage VS2 is set to be steeper than that of the slope voltage VS1. Additionally, when the capacitor C1 is disconnected from the soft-start circuit 1A, the gradient of the slope voltage Vs1 becomes upright or exceedingly steep.

In the voltage conversion circuit 7, the voltage comparison circuit 71 and the switching circuit 72 are used to obtain the circuit whose voltage is lowest.

The voltage conversion circuit 7 compares the slope voltage VS1 with the slope voltage VS2 and outputs the lower of the slope voltage VS1 and VS2 (either the slope voltage V1 or V2 whose gradient is milder) as the voltage VA, that is, the voltage conversion circuit 7 generates and outputs the voltage VA whose gradient is milder than the gradient (steeper gradient) of the steeper of the slope voltage VS1 and VS2.

The voltage comparison circuit 11 compares the voltage VA with the reference voltage VREF. When the voltage VA is lower than the reference voltage VREF1, the voltage comparison circuit 11 outputs the voltage VA as the soft-start voltage VSS. When the voltage VA is equal to or higher than the reference voltage VREF, the voltage comparison circuit 11 outputs the reference voltage VREF as the soft-start voltage VSS.

Figure 7:
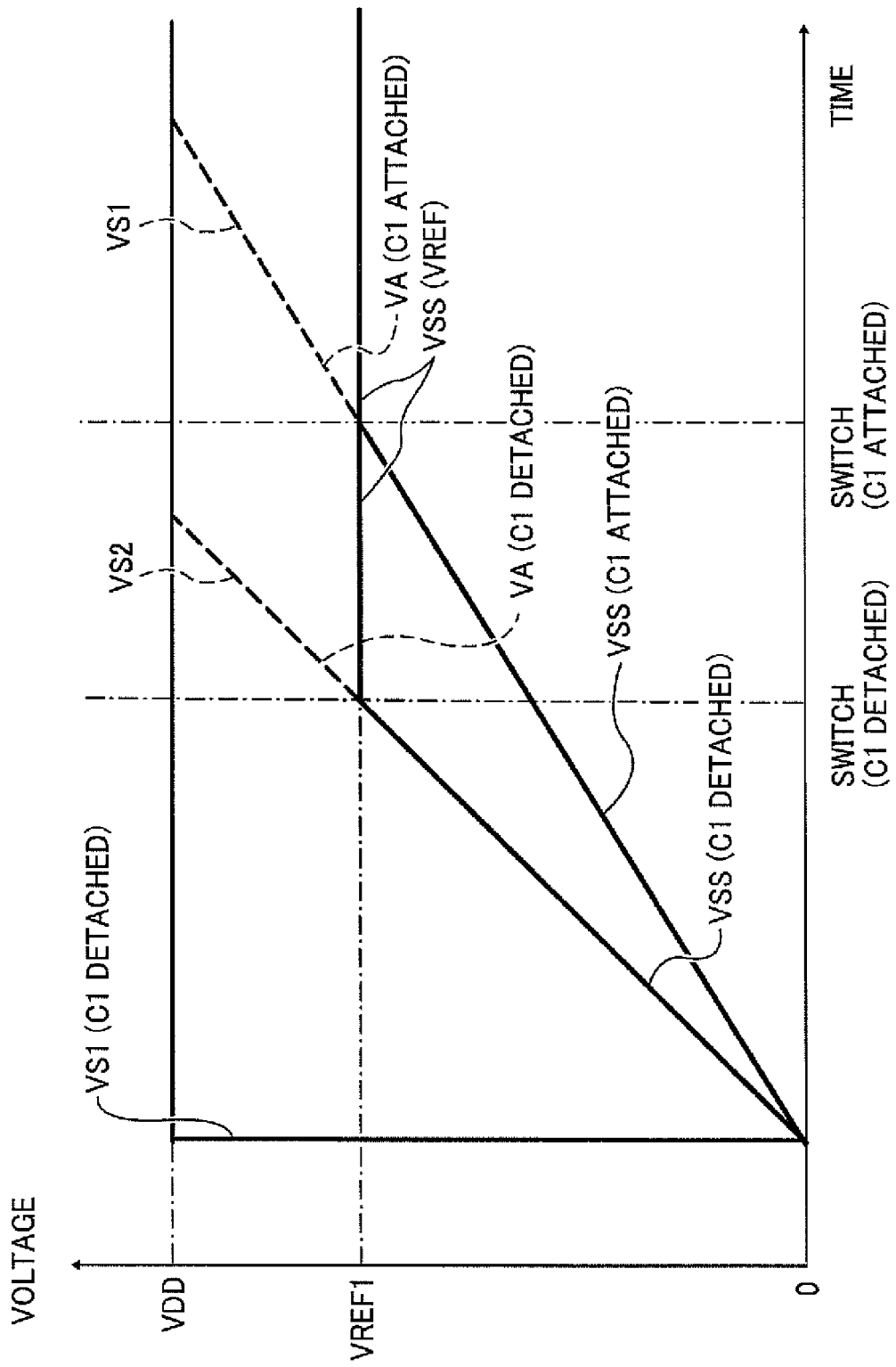
FIG. 7 shows respective voltages in the soft-start circuit shown in FIG. 6.

FIG. 7 shows respective voltages in the soft-start circuit 1A. In the present embodiment shown in FIG. 7, when the external capacitor C1 is connected to the soft circuit 1A, the slope voltage VS1 is generated by charging the capacitor C1 from the current source I1, and the gradient of the slope voltage VS1 is set to be milder than that of the slope voltage VS2.

Additionally, when the external capacitor C1 is connected to the soft-start circuit 1A, the voltage conversion circuit 7 compares the slope voltage VS1 with the slope voltage VS2. More specifically, the slope voltage VS2 is outputted from the voltage conversion circuit 7 as the voltage VA when the slope voltage VS1 is lower than the slope voltage VS2, and the slope voltage VS1 is outputted from the voltage conversion circuit 7 as the voltage VA when the slope voltage VS1 is equal to or greater than the slope voltage VS2.

Then, when the external capacitor C1 is connected to the soft-start circuit 1A and the voltage VA is lower than the reference voltage VREF, the slope voltage VS1 is outputted from the selection circuit 5 as the soft-start voltage VSS. At this time, the output voltage VSS has a gradient that is identical to the gradient of the slope voltage VS1 and a voltage value that is identical to voltage value of the slope voltage VS1.

In other cases, when the external capacitor C1 is disconnected from the soft-start circuit 1A and the voltage VA is lower than the reference voltage VREF, the slope voltage VS2 is outputted from the selection circuit 5 as the output voltage VSS. At this time, the output voltage VSS has a gradient that is identical to the gradient of the slope voltage VS2 and a voltage value that is identical to voltage value of the slope voltage VS2.

By contrast, when the second voltage V1 is equal to or higher than the reference voltage VREF, regardless of whether the capacitor C1 is connected to the soft-start circuit 1A, the first reference voltage VREF is outputted from the selection circuit 5 as the soft-start voltage VSS.

Power Supply Circuit

Figure 8:
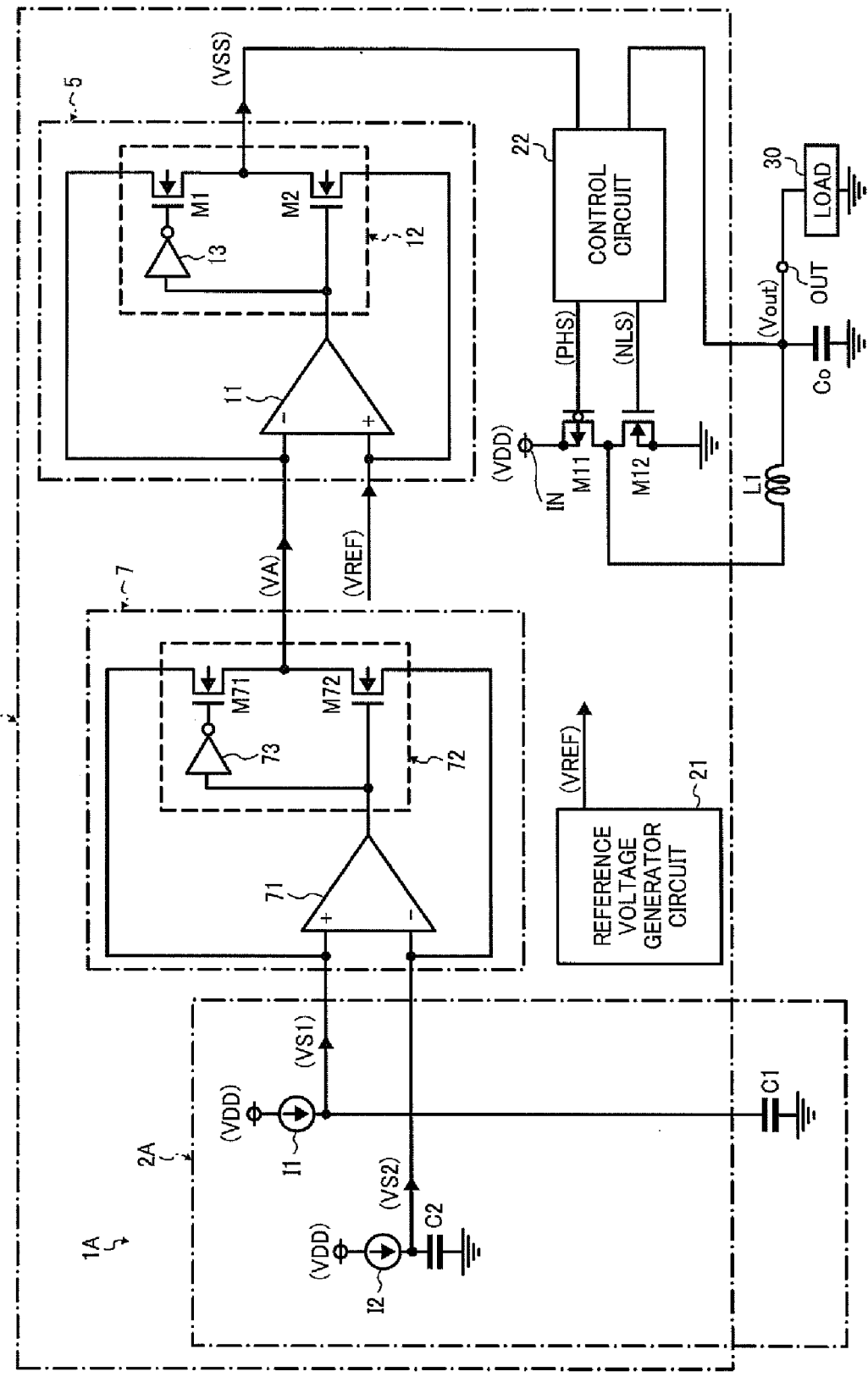
FIG. 8 illustrates circuitry of a power supply circuit using the soft-start circuit shown in FIG. 6.

Next, FIG. 8 illustrates circuitry of a power supply circuit 20A using the soft-start circuit 1A shown in FIG. 6. As shown in FIG. 8, the difference between the power supply circuit 20A and the power supply circuit 20 (shown in FIG. 4) is that the soft-start circuit 1A includes the soft-start circuit 1A instead of the soft-start circuit 1 and a reference voltage generator circuit 21 generates and outputs only the single reference voltage VREF to the soft-start circuit 1A instead of generating the multiple reference voltages VREF1 through VREFn.

In the power supply circuit 20A, the respective circuits except the inductor L1, the capacitor C1, and the output capacitor Co can be integrated on a single IC. Alternatively, the respective circuits except the output transistor M11, the synchronous rectification transistor M12, the inductor L1, the capacitor C1, and the output capacitor Co can be integrated on a single IC. Consequently, by integrating multiple components of the power supply circuit 20A on a single IC, reduction in the external components as well as adjustment of the gradient of the output voltage during starting time using the external capacitor can be achieved.

As described above, in the soft-start circuit 1A according to the second embodiment, the voltage VA is determined to be the lower of the slope voltages VS1 and VS2, and the voltage VA is compared with the reference voltage VREF. When the first voltage is lower than the reference voltage VREF, the voltage VA is outputted as the soft-start voltage VSS, and when the voltage VA is equal to or higher than the reference voltage VREF, the reference voltage VREF is outputted as the soft-start voltage VSS.

Therefore, in the above-described configuration as well, similarly to the first embodiment, two slope voltages can be generated independently from each other, and even when one of the two slope voltages becomes steeper, a soft-start voltage whose gradient is relatively mild can still be obtained.

Furthermore, the soft-start circuit of the present embodiment includes only a single voltage conversion circuit, and therefore, the circuit can be more compact. Additionally, the start voltage of the voltage VA can be 0 V when the start voltage of the slope voltage VS1 and the VS2 is 0 V, which is preferable.

Third Embodiment

Figure 9:
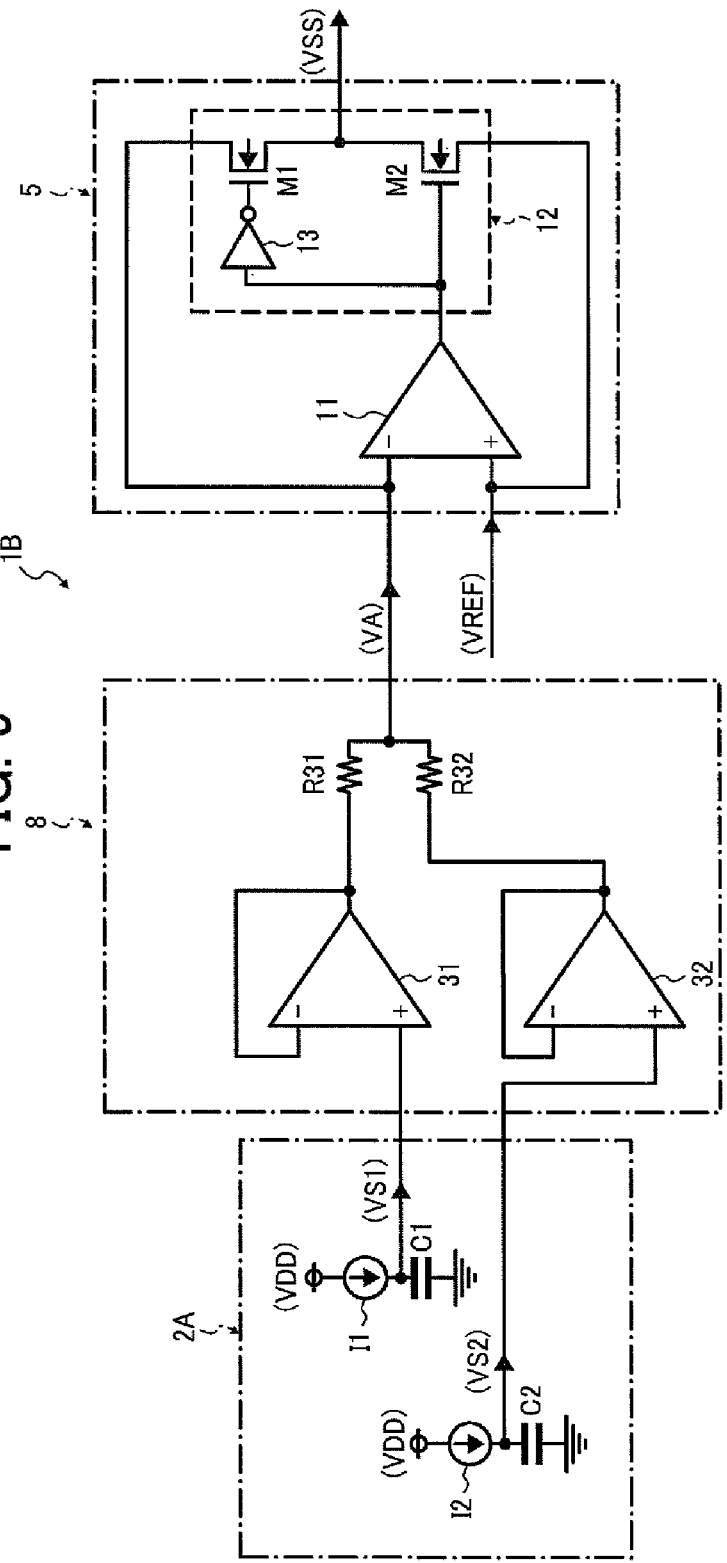
FIG. 9 illustrates circuitry of a soft-start circuit according to a third illustrative embodiment.

FIG. 9 illustrates circuitry of a soft-start circuit 1B according to a third embodiment. It is to be noted that, in FIG. 9, descriptions of components identical or similar to those shown in FIG. 6 are omitted below for simplicity.

The difference between the soft-start circuit 1B shown in FIG. 9 and the soft-start circuit 1A shown in FIG. 6 is that a voltage conversion circuit 8 is included instead of the voltage comparison circuit 7.

As shown in FIG. 9, the soft-start circuit 1B includes the slope voltage generator circuit 2A, the voltage conversion circuit 8 that converts the voltage of the slope voltage VS1 and VS2, and the selection circuit 5. The voltage conversion circuit 8 includes operational amplifier circuits 31 and 32, and resistors R31 and R32. The voltage conversion circuit 8 serves as a voltage conversion circuit.

In the voltage conversion circuit 8, an output terminal of the operational amplification circuit 31 and an inverting input terminal thereof are connected, that is, the operational amplification circuit 31 is wired as a "voltage follower". The slope voltage VS1 is applied to a non-inverting input terminal of the operational amplification circuit 31, and the output terminal of the operational amplification circuit 31 is connected to one end of the resistor R31.

Similarly, an output terminal of the operational amplification circuit 32 and an inverting input terminal thereof are connected, that is, the operational amplification circuit 31 is wired as a "voltage follower". The slope voltage VS2 is applied to a non-inverting input terminal of the operational amplification circuit 32, and the output terminal of the operational amplification circuit 32 is connected to one end of the resistor R32. The other end of the resistor R31 is connected to the other end of the resistor R32, and the voltage VA is outputted from a junction node between the resistors R31 and R32.

In the soft-start circuit 1B, the voltage conversion circuit 8 generates the voltage VA that is a medium voltage between the slope voltage VS1 and the second voltage V2, in order to obtain a voltage whose gradient is milder than the gradient of the steeper of the slope voltages VS1 and VS2. When the resistances of the resistors R31 and R32 are indicated as r1 and r2, the voltage VA can be expressed by formula I shown below.

$$VA = (r2 \times VS1 + R1 \times VS2)/(r1 + r2) \quad (1)$$

In this configuration, the slope voltages VS1 and VS2 can be generated independently from each other, and additionally, even when the gradient of the slope voltage VS1 becomes steep when the capacitor C1 is disconnected from the soft circuit 1B, the voltage VA whose gradient is mild can still be obtained.

As described above, the soft-start circuit 1B generates the voltage VA that is a voltage between the slope voltages VS1 and VS2, and therefore, the configuration of the third embodiment can achieve effects similar to those of the soft-start circuit 1A described above.

As can be appreciated by those skilled in the art, the configuration of a power supply circuit including the soft-start circuit 1B described above would be similar to the power supply circuit 20A shown in FIG. 8, except that the soft-start circuit 1B is included instead of the soft-start circuit 1A.

Fourth Embodiment

Figure 10:
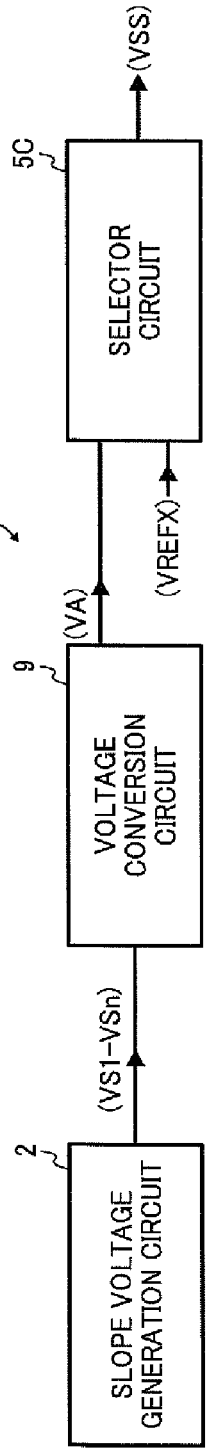
FIG. 10 is a block diagram of a soft-start circuit according to a fourth illustrative embodiment.

FIG. 10 is a block diagram of a soft-start circuit 1c according to a fourth embodiment. It is to be noted that, in FIG. 10, descriptions of components identical or similar to those shown in FIGS. 1 and 3 are omitted below for simplicity.

In FIG. 10, the soft-start circuit 1c includes the slope voltage generator circuit 2, a voltage conversion circuit 9, and a selection circuit 5C. The voltage conversion circuit 9 receives the multiple slope voltages VS1 through VSn, and generates and outputs as the voltage VA a voltage whose gradient is milder than the steepest gradient among the slope voltages VS1 through VSn generated from the slope voltage generator circuit 2.

That is, the voltage VA outputted from the voltage conversion circuit 9 is applied to the selection circuit 5C, and the selection circuit 5C compares the voltage VA with a reference voltage VREFX and outputs either the voltage VA or the reference voltage VREFX in accordance with the comparison result. Accordingly, the selection circuit outputs the voltage whose gradient is milder than the steepest gradient among the slope voltages VS1 through VSn as the output voltage VSS.

The configuration of a power supply circuit including the soft-start circuit 1C would be similar to that of the power supply circuit 20A shown in FIG. 8, except that the soft-start circuit 1c is included instead of the soft-start circuit 1A and the reference voltage VREFX is generated instead of the reference voltage VREF.

It is to be noted that although in the above-described embodiments a synchronous step-down switching regulator is used as the power supply circuit, the power supply circuit is not limited thereto, and other power supply circuits, such as a synchronous step-up switching regulator, an inverting switching regulator, or a series regulator, can be utilized.

As described above, the soft-start circuit according to above-described various embodiments is applicable to power supply circuits in which the feedback voltage Vfb is generated by dividing the output voltage Vout and the output transistor is controlled such that the output voltage Vout can be constantly keep at a specified voltage using the reference voltage formed by the feedback voltage Vfb.

Additionally, the soft-start circuit according to above-described embodiments and variations thereof can be applied to a current mode control switching regulator that detects an inductor current flowing through the inductor L1 and controls the output transistor such that the output voltage Vout is kept at a specified voltage based on the detected inductor current.

Numerous additional modifications and variations are possible in light of the above teachings. It is therefore to be understood that, within the scope of the appended claims, the disclosure of this patent specification may be practiced otherwise than as specifically described herein.

What is claimed is:

1. A soft-start circuit to generate and output a soft-start voltage having a specified gradient, the soft-start circuit comprising:
   a slope voltage generator circuit to generate and output multiple slope voltages having different specified gradients, including a steepest slope voltage whose gradient is steepest among the gradients of the multiple slope voltages and a mildest slope voltage whose gradient is mildest among the gradients of the multiple slope voltages;
   a first voltage conversion circuit to receive the multiple slope voltages generated by the slope voltage generator circuit and output a first voltage whose gradient is milder than the gradient of the steepest slope voltage;
   a second voltage conversion circuit to receive the multiple slope voltages generated by the slope voltage generator circuit and output a second voltage whose gradient is milder than the gradient of the steepest slope voltage; and
   a selection circuit to receive a specified first reference voltage and a specified second reference voltage generated by a reference voltage generator circuit, the first voltage, and the second voltage, compare the second voltage with the specified second reference voltage, and output either the first voltage or the specified first reference voltage as the soft-start voltage in accordance with a comparison result generated by the selection circuit.

2. The soft-start circuit according to claim 1, wherein the slope voltage generator circuit comprises:
   multiple current sources to generate current; and
   multiple capacitors capable of accepting the current generated by a respective one of the multiple current sources,
   wherein a voltage at one end of each of the multiple capacitors is a respective one of the multiple slope voltages.

3. The soft-start circuit according to claim 2, wherein the multiple slope voltages are respectively either charging voltages generated by charging the multiple capacitors from the respective current sources or specified voltages whose gradients are identical to the gradients of the charging voltages.

4. The soft-start circuit according to claim 3, wherein all circuits except at least one of the multiple capacitors in the slope voltage generator circuit are integrated as a single integrated circuit,
   the at least one of the multiple capacitors is at least one external capacitor, and
   the multiple capacitors exclude the at least one external capacitor are internal capacitors.

5. The soft-start circuit according to claim 4, wherein, when the at least one external capacitor is connected to the slope voltage generator circuit, the selection circuit outputs, as the soft-start voltage, the first voltage that follows a slope voltage with the mildest gradient among the slope voltages generated by charging both the internal capacitors and the at least one external capacitor until the second voltage reaches the second reference voltage.

6. The soft-start circuit according to claim 4, wherein, when the at least one external capacitor is disconnected from the slope voltage generator circuit, the selection circuit outputs, as the soft-start voltage, the first voltage that follows the slope voltage with the mildest gradient among the slope voltages generated by charging the internal capacitors until the second voltage reaches the second reference voltage.

7. The soft-start circuit according to claim 4, wherein, after the second voltage reaches the second reference voltage, the selection circuit outputs the first reference voltage as the soft-start voltage regardless of whether the external capacitor is connected to the slope voltage generator circuit.

8. The soft-start circuit according to claim 1, wherein the second reference voltage is higher than the first reference voltage, an upper limit of the second voltage is higher than the second reference voltage, and an upper limit of the first voltage is the first reference voltage.

9. A soft-start circuit to generate and output a soft-start voltage having a specified gradient, the soft-start circuit comprising:
   a slope voltage generator circuit to generate and output multiple slope voltages having different specified gradients, including a steepest slope voltage whose gradient is steepest among the gradients of the multiple slope voltages and a mildest slope voltage whose gradient is mildest among the gradients of the multiple slope voltages;
   a voltage conversion circuit to receive the slope voltages and output a voltage whose gradient is milder than the gradient of the steepest slope voltage; and
   a selection circuit to receive a specified reference voltage generated by a slope voltage generator circuit, and the voltage generated by the voltage conversion circuit, compare the voltage with the specified reference voltage, and output either the voltage or the specified reference voltage as the soft-start voltage in accordance with a comparison result generated by the selection circuit.

10. The soft-start circuit according to claim 9, wherein the slope voltage generator circuit comprises:
    multiple current sources to generate current; and
    multiple capacitors capable of accepting the current generated by a respective one of the current sources,
    wherein a voltage at one end of each of the multiple capacitors is a respective one of the slope voltages.

11. The soft-start circuit according to claim 10, wherein the multiple slope voltages are respectively either charging voltages generated by charging the multiple capacitors from the respective current sources or specified voltages whose gradients are identical to the gradients of the charging voltages.

12. The soft-start circuit according to claim 10, wherein all circuits except at least one of the multiple capacitors in the slope voltage generator circuit are integrated as an integrated circuit,
    the at least one of the multiple capacitors is at least one external capacitor, and
    the multiple capacitors exclude the at least one external capacitor are internal capacitors.

13. The soft-start circuit according to claim 12, wherein, when the at least one external capacitor is connected to the slope voltage generator circuit, the selection circuit outputs, as the soft-start voltage, the voltage that follows the mildest slope voltage among the slope voltages generated by charging the internal capacitors and the external capacitor until the voltage reaches the reference voltage.

14. The soft-start circuit according to claim 12, wherein, when the external capacitor is disconnected from the slope voltage generator circuit, the selection circuit outputs, as the soft-start voltage, the voltage that follows the mildest slope voltage among the slope voltages generated by charging the internal capacitors until the voltage reaches the reference voltage.

15. The soft-start circuit according to claim 12, wherein, after the voltage reaches the reference voltage, the selection circuit outputs the reference voltage as the soft-start voltage regardless of whether the external capacitor is connected to slope voltage generator circuit.

16. A power supply circuit to change an input voltage applied to an input terminal and output a specified output voltage from an output terminal, the power supply circuit comprising:
an output transistor to control the output voltage by operating in accordance with a control signal from a control terminal; and
a soft-start circuit to generate and output a soft-start voltage having a specified gradient, the soft-start circuit comprising:
a slope voltage generator circuit to generate and output multiple slope voltages having different specified gradients, including a steepest slope voltage whose gradient is steepest among the gradients of the multiple slope voltages and a mildest slope voltage whose gradient is mildest among the gradients of the multiple slope voltages;
a voltage conversion circuit to receive the slope voltages and generate a voltage whose gradient is milder than the gradient of the steepest slope voltage;
a selection circuit to receive at least one specified reference voltage generated by a reference voltage generator circuit and at least one the voltage outputted from the voltage conversion circuit and compare one of the voltage with one of the specified reference voltage and output either one of the voltage or one of the specified reference voltage as the soft-start voltage in accordance with a comparison result generated by the selection circuit.

17. The power supply circuit according to claim 16, wherein the voltage conversion circuit comprises:
a first voltage conversion part to receive the slope voltages and output a first voltage whose gradient is milder than the gradient of the steepest slope voltage and a second voltage conversion part to receive the slope voltages and output a second voltage whose gradient is milder than the gradient of the steepest slope voltage; and
a selection circuit to receive a specified first reference voltage, a specified second reference voltage, the first voltage, and the second voltage, compare the second voltage with a specified second reference voltage, and output either the first voltage or the specified first reference voltage as the soft-start voltage in accordance with a comparison result generated by the selection circuit.

18. The power supply circuit according to claim 16, wherein the voltage conversion circuit comprises a voltage conversion circuit to receive the slope voltages and output a first voltage whose gradient is milder than the gradient of the steepest slope voltage; and
a selection circuit to receive a specified first reference voltage and the first voltage, compare the first voltage with a specified first reference voltage, and output either the first voltage or the specified first reference voltage as the soft-start voltage in accordance with a comparison result generated by the selection circuit.

19. The power supply circuit according to claim 16, wherein the slope voltage generator circuit in the soft-start circuit comprises:
multiple current sources to generate current; and
multiple capacitors capable of accepting the current generated by a respective one of the current sources, and a voltage at one end of the capacitor is a respective one of the slope voltages.

20. The power supply circuit according to claim 16, wherein all circuits except at least one of the capacitors in the soft-start circuit is integrated as an integrated circuit,
the at least one of the multiple capacitors is at least one external capacitor, and
the multiple capacitors exclude the at least one external capacitor are internal capacitors.

* * * * *